United States Patent [19]
DeLuca et al.

[11] 3,995,600
[45] Dec. 7, 1976

[54] HYDROGEN FUELED ROTARY ENGINE

[76] Inventors: John J. DeLuca, 2903 Dawson Ave., Silver Spring, Md. 20902; Wayne E. Hughes, 356 Mae Road, Glen Burnie, Md. 21061

[22] Filed: June 9, 1975

[21] Appl. No.: 585,419

[52] U.S. Cl. .............................. 123/8.13; 418/15; 418/90; 418/100; 418/113
[51] Int. Cl.² .......................................... F02B 53/10
[58] Field of Search ............... 123/8.13, 8.45, 1 A, 123/198 D; 418/90, 15, 113, 100

[56] References Cited

UNITED STATES PATENTS

| | | | |
|---|---|---|---|
| 1,369,070 | 2/1921 | Williams et al. | 418/99 X |
| 3,261,334 | 7/1966 | Paschke | 123/8.45 |
| 3,301,233 | 1/1967 | Dotto et al. | 123/8.45 |
| 3,471,274 | 10/1969 | Quigley et al. | 123/1 A X |
| 3,903,646 | 9/1975 | Norton | 123/198 D X |
| 3,908,608 | 9/1975 | Fox | 123/8.45 X |

FOREIGN PATENTS OR APPLICATIONS

| | | | |
|---|---|---|---|
| 1,345,300 | 10/1963 | France | 123/8.45 |
| 2,115,765 | 10/1972 | Germany | 123/1 A |

*Primary Examiner*—Carlton R. Croyle
*Assistant Examiner*—Michael Koczo, Jr.
*Attorney, Agent, or Firm*—Ronald F. Sandler; Gary F. Grafel; John R. Manning

[57] ABSTRACT

A rotary piston internal-combustion engine adapted to operate on a hydrogen fuel gas mixture injected into the intake chamber of the engine through a plurality of spaced intake ports in the engine housing designed to distribute the flow of the fuel gas mixture evenly along the width of the intake chamber. The exhaust gas outlet of the engine includes a plurality of spaced small exhaust ports so as to decrease the dwell of the apex seal of the rotary piston as it passes over the exhaust gas outlet. The fuel supply system to the engine includes a plurality of mixing chambers to ensure thorough and uniform mixing of the fuel gas mixture, an intake header for distributing the fuel gas mixture to the intake ports, and means for preventing back-fire of the fuel gas mixture in the system. Lubricant may be supplied to the interior of the engine through the fuel intake ports in the form of a lubricating vapor in admixture with the fuel gas mixture. In an alternative embodiment, the engine housing is provided with an inlaid strip of hard porous material designed for passage of lubricating oil.

10 Claims, 5 Drawing Figures

HYDROGEN FUELED ROTARY ENGINE

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

The present invention relates generally to rotary piston internal-combustion engines, and more particularly, to such engines adapted to operate on a hydrogen gas fuel mixture.

2. Brief Description of the Prior Art

With the growing demands in recent years of emission control and cost reduction in the automobile industry, there has been an increased interest in the rotary piston engine as a possible replacement for the conventional reciprocating piston engine. In a rotary piston internal-combustion engine, a polygonal piston rotates within an epitrochoidally-shaped engine housing, the piston and housing defining between them a plurality of working chambers that rotate about the axis of the housing and cyclically vary in volume as the piston rotates relative to the housing so as to effectively provide in succession a suction space, a compression space and an expansion space. The previously proposed rotary piston internal-combustion engines have been designed to operate on conventional combustion fuels which are injected generally through a single injection port into the working chambers of the engine where they are admixed with air for ignition. Moreover, in the prior art rotary engines, maintaining adequate lubrication of the piston apex seal surfaces in contact with the housing has been a major problem.

The detrimental air polluting effects of the exhaust gases from conventional combustion fuels are well known. Among the various efforts that have been made to reduce the amount of such air pollutants, it has previously been proposed to fuel internal-combustion engines with hydrogen gas, which burns in air to yield water as the main product of combustion and therefore results in fewer atmospheric contaminants. However, these previous proposals of using hydrogen as a fuel for internal-combustion engines all employed conventional reciprocating piston-type internal-combustion engines and suffered because of the various intake and exhaust valve problems and the extreme difficulties involved in producing a uniform explosion mixture in the firing chamber so as to provide an even ignition and allow the full high energy content of the fuel mixture to be utilized.

OBJECTS AND SUMMARY OF THE INVENTION

It is therefore an object of the present invention to provide a rotary piston internal-combustion engine designed to operate in a manner so as to substantially reduce the introduction of pollutants into the atmosphere.

Another object of the present invention is to provide a rotary piston internal-combustion engine designed to operate on a hydrogen fuel gas mixture.

An additional object of the present invention is to provide a hydrogen-fueled rotary piston internal-combustion engine designed to produce a uniform explosion mixture in the firing chambers of the engine.

A further object of the present invention is to provide a hydrogen-fueled rotary piston internal-combustion engine having a fuel injection system designed to distribute the flow of the fuel gas mixture evenly along the width of the intake chamber of the engine so as to provide a smooth and even firing of the fuel gas mixture.

Still another object of the present invention is to provide a hydrogen-fueled rotary piston internal-combustion engine having a fuel supply system designed to prevent backfire of the fuel gas mixture.

Still a further object of the present invention is to provide a hydrogen-fueled rotary piston internal-combustion engine having improved means for maintaining adequate lubrication of the piston apex seal surfaces in contact with the engine housing.

The foregoing and other objects are attained in accordance with one aspect of the present invention through the provision of a novel fuel supply and injection system in a rotary piston internal-combustion engine which enables the engine to operate on a hydrogen fuel gas mixture and thereby substantially reduce the introduction of pollutants into the atmosphere. The fuel inlet passage means extending through the wall of the engine housing into the intake chamber of the engine comprises a plurality of intake ports spaced along a line extending substantially across the width of the engine housing transverse to the direction of rotation of the piston so as to distribute the flow of the fuel gas mixture evenly along the width of the intake chamber. The fuel supply system for delivering a combustible fuel gas mixture from a fuel source to the fuel inlet passage means of the engine includes a plurality of mixing chambers connected in series to ensure thorough and uniform mixing of hydrogen gas with an oxidizing gas, such as air, oxygen, or water vapor, a fuel intake header on the outer surface of the engine housing covering all of the intake ports for distributing the fuel gas mixture from the final mixing chamber to each of the intake ports, and means for preventing backfire of the fuel gas mixture in the system. The exhaust gas outlet passage extending through the wall of the engine housing also comprises a plurality of small exhaust ports spaced along a line extending substantially across the width of the engine housing transverse to the direction of rotation of the piston in order to decrease the dwell of the apex seal of the piston as it passes over the exhaust gas outlet. An exhaust gas header on the outer surface of the engine housing covers all of the exhaust ports and terminates in a single exhaust pipe.

Lubricant for lubricating the apex seal surfaces of the rotary piston in contact with the engine housing, in a preferred embodiment, is supplied to the interior of the engine through the fuel intake ports in the form of a lubricating vapor in admixture with the fuel gas mixture, in which case there is connected to the mixing chambers of the fuel supply system a source of lubricating oil provided with vaporizer means for converting the lubricating oil to lubricating vapor. In an alternative embodiment, the engine housing is provided with an in laid strip of hard porous material leading to the intake chamber of the engine and designed for the passage of lubricating oil.

BRIEF DESCRIPTION OF THE DRAWINGS

Various objects, features and attendant advantages of the present invention will be more fully appreciated as the same becomes better understood from the fol lowing detailed description of the present invention when considered in connection with the accompanying drawings, in which.

DETAILED DESCRIPTION OF PREFERRED EMBODIMENTS

Figure 1:
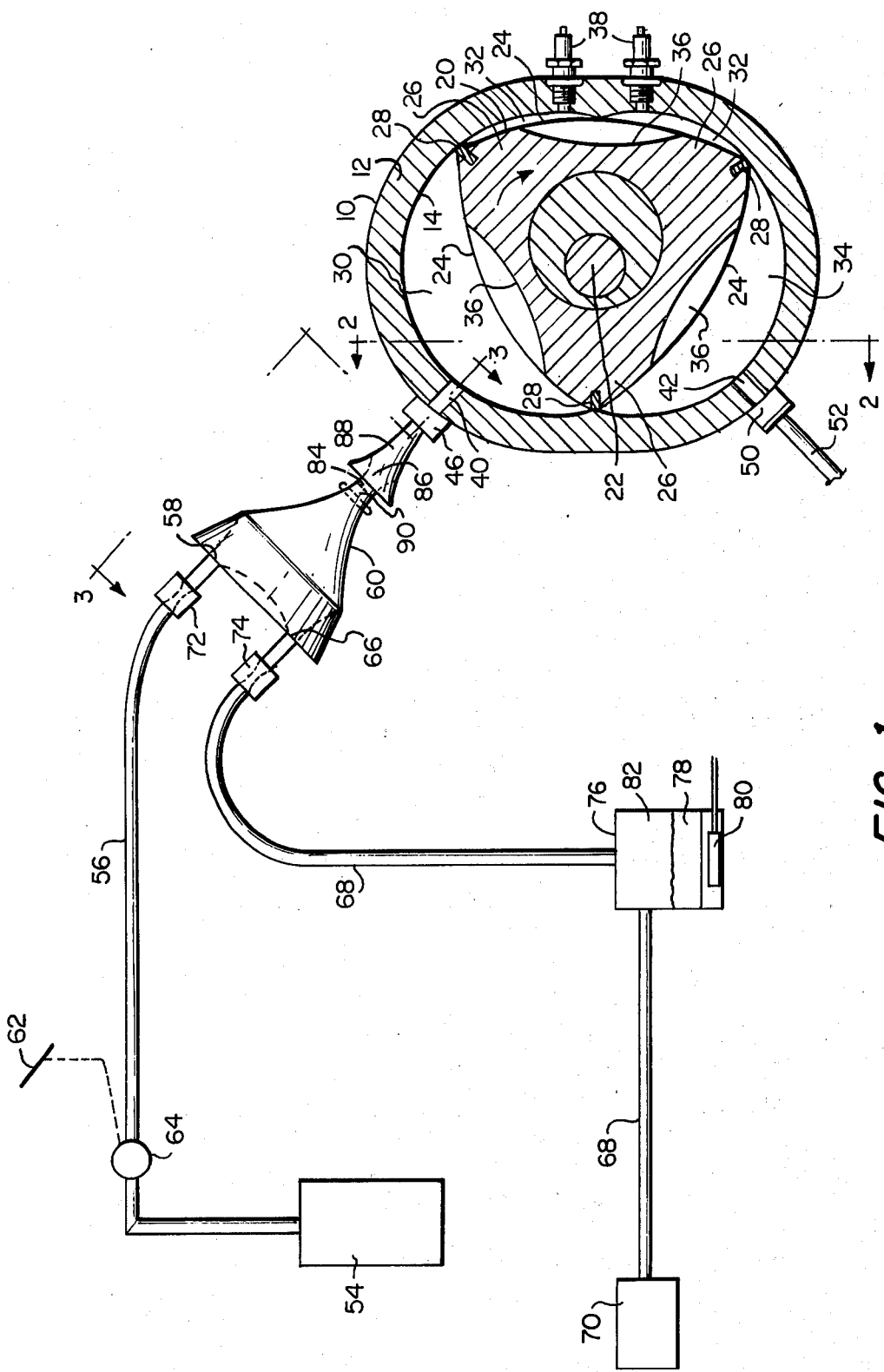
FIG. 1 is a central vertical section of a rotary piston internal-combustion engine showing the rotary piston positioned within the engine housing, in combination with an elevational view of a preferred embodiment of the fuel supply and injection system of the present invention.
Figure 2:
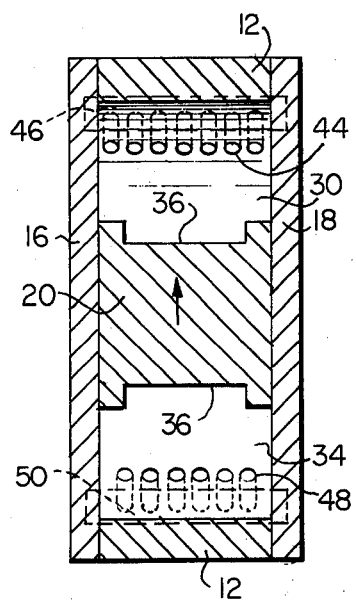
FIG. 2 is a sectional view taken substantially along the line 2—2 of FIG. 1, looking in the direction of the arrows.
Figure 3:
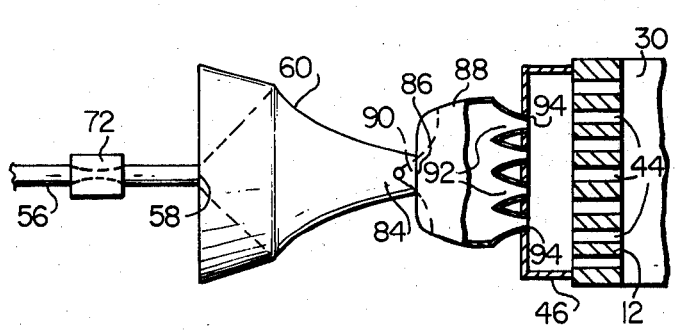
FIG. 3 is a partial top view of the system shown in FIG. 1, taken partly in section substantially along the line 3—3 of FIG. 1, looking in the direction of the arrows.

Referring now to the drawings, and in particular to FIGS. 1-3, a hydrogen-fueled rotary piston internal-combustion engine in accordance with one embodiment of this invention, is shown as including an engine housing 10 comprising a peripheral wall 12 that has a curved inner surface 14, and a pair of axially-spaced end walls 16 and 18 that are disposed on opposite sides of the peripheral wall 12 and secured thereto. The curved inner surface 14 of the engine housing 10 has basically the form of an epitrochoid in geometric shape and includes two lobe portions.

Within the engine housing 10, the rotary piston internal-combustion engine is of conventional construction and includes a generally triangular rotary piston 20 rotatably mounted in known manner so as to rotate relative to the engine housing 10 and eccentrically with respect to the main engine axis 22. As shown most clearly in FIG. 1, the rotary piston 20 includes three arcuate working faces 24 and three apex portions 26. The apex portions 26 carry radially movable sealing members 28 which are in substantially continuous gas-sealing engagement with the inner surface 14 of the engine housing 10 as the rotary piston 20 rotates within and relative to the engine housing 10. The three working faces 24 of the rotary piston 20 cooperate with the inner surface 14 of the engine housing 10 to effectively define therebetween three separate working chambers separated by the sealing members 28. As the rotary piston 20 rotates relative to the engine housing 10, in the clock-wise direction indicated by the arrow as viewed in FIG. 1, each of these working chambers rotates about the main engine axis 22 and cyclically varies in volume so as to effectively provide in succession a suction space 30, a compression space 32, and an expansion space 34. The working faces 24 of the rotary piston 20 are provided with cut-out portions or channels 36 that permit gases in the combustion space 32 to pass freely from one lobe of the epitrochoidal inner surface 14 to the other lobe when the rotary piston 20 is in the maximum compression position shown in FIG. 1.

Sparkplugs 38 are mounted in the peripheral wall 12 of the engine housing 10 adjacent to the compression space 32, and at the appropriate time in the engine cycle, the sparkplugs 38 provide ignition for a compressed combustible gas mixture which, on expansion, drives the rotary piston 20 in the direction of the arrow.

The conventional rotary piston internal-combustion engine thus far described is provided, in accordance with the present invention, with novel fuel inlet passage means 40 extending through the peripheral wall 12 of the engine housing 10 into the suction space 30, and novel exhaust gas outlet passage means 42 extending through the peripheral wall 12 of the engine housing 10 from the expansion space 34. As best seen in FIGS. 2 and 3, the fuel inlet passage means 40 comprises a plurality of intake ports 44 spaced along a line extending substantially across the width of the peripheral wall 12 of the engine housing 10 transverse to the direction of rotation of the rotary piston 20. The use of this configuration instead of the one large intake port used in the prior art rotary engines serves the purpose of distributing the flow of the fuel gas mixture evenly along the width of the intake chamber of the engine so as to produce a smooth and even firing of the fuel has mixture. A hollow fuel intake header 46 extending across the width of the outer surface of the peripheral wall 12 of the engine housing 10 covers all of the intake ports 44 for distributing the fuel gas mixture from the fuel supply system to each of the intake ports.

As best seen in FIG. 2, the exhaust gas outlet passage means 42 similarly comprises a plurality of exhaust ports 48 spaced along a line extending substantially across the width of the peripheral wall 12 of the engine housing 10 transverse to the direction of rotation of the rotary piston 20. The use of this configuration instead of the one large exhaust port used in the prior art rotary engines serves the purpose of decreasing the dwell of the sealing members 28 on the apex portions 26 of the rotary piston 20 as they pass over the exhaust gas outlet. An exhaust gas header 50 extending across the width of the outer surface of the peripheral wall 12 of the engine housing 10 covers all of the exhaust ports 48 and terminates in a single exhaust pipe 52.

The line of intake ports 44 and the line of exhaust ports 48 are spaced from each other across the line separating the suction space 30 from the expansion space 34 by at least 90°, and preferably as much as 120°, with respect to the main engine axis 22. In the preferred embodiment as shown in FIG. 2, the number of the intake ports 44 and the number of exhaust ports 48 differ by 1, with the spacing of the intake ports and exhaust ports along their respective lines being such that the intake ports and exhaust ports are in staggered relation to each other. If intake ports 44 and exhaust ports 48 were in line and of the same number, sealing members 28 would not wear when they pass over the intake and exhaust port openings. This will effect uneven wear of the sealing members which will cause gaps to form between the sealing members and surface 14 thereby allowing the hydrogen fuel gas mixture and exhaust gases to escape through the gaps. The result would be poor compression and exhaust gas extraction. By staggering the intake and exhaust ports and preferably making the exhaust ports one less than the intake ports, all contact areas of the sealing members will wear evenly for each revolution of the piston, thereby ensuring that all contact areas of the sealing members remain in sliding contact with surface 14. Although the intake ports and exhaust ports are shown as being circular in cross-section, such ports, if desired, can be formed in other cross-sectional shapes, such as oblong or rectangular.

The rotary piston internal-combustion engine of the present invention is designed to operate on a combustible fuel gas mixture of hydrogen with an oxidizing gas, such as air or oxygen mixed with water vapor. A uniform combustible hydrogen fuel gas mixture is supplied to the suction space 30 of the engine through the intake ports 44 by means of the fuel supply system illustrated in FIGS. 1 and 3 and which terminates in the fuel intake header 46. The fuel supply system includes a hydrogen storage tank 54 containing hydrogen gas under pressure, and a hydrogen gas conduit 56 connecting the hydrogen storage tank 54 to the hydrogen gas inlet 58 of a first mixing chamber 60. A control pedal or accelerator 62 is operatively linked to a valve 64 in the hydrogen gas conduit 56 to vary the amount of hydrogen fed into the first mixing chamber 60. The first mixing chamber 60 is also provided with an oxidizing gas inlet 66, to which is connected an oxidizing gas conduit 68. In the embodiment shown, with air being used as the oxidizing gas, the other end of the oxidizing gas conduit 68 is connected to an air cleaner 70 through which atmospheric air is drawn into the system. If pure oxygen is to be used as the oxidizing gas, the air cleaner 70 would be replaced with an oxygen storage tank containing oxygen gas under pressure, in which case the oxidizing gas conduit 68 would be provided with suitable valving arrangement to regulate the amount of oxygen fed to the first mixing chamber 60, similar to that described above for the hydrogen gas. Both the hydrogen gas conduit 56 and the oxidizing gas conduit 68 are provided with anti-backfire orifices 72 and 74, respectively, adjacent to their connections with the first mixing chamber 60 for preventing backfire of the combustible fuel gas mixture from reaching the sources of the fuel gases.

Connected into the oxidizing gas conduit 68 is a lubricant supply tank 76 having its lower portion filled with lubricating oil 78 and provided with an electric heater 80 for vaporizing the lubricating oil 78 and thereby converting it to lubricating vapor which fills the upper portion 82 of the tank 76. The oxidizing gas conduit 68 passes through and opens into the upper portion 82 of the tank 76 and thereby carries the lubricating vapor with the oxidizing gas into the first mixing chamber 60.

In the first mixing chamber 60, initial mixing together of the hydrogen gas, the oxidizing gas and the lubricating vapor is effected. The first mixing chamber 60 is provided with a gaseous mixture outlet 84 which is in communication with the gaseous mixture inlet 86 of a second mixing chamber 88 wherein the gases are further mixed so as to ensure a more uniform combustible fuel gas mixture. The gaseous mixture outlet 84 of the first mixing chamber 60 is provided with a one-way valve 90 for preventing backflow of the gaseous mixture from the second mixing chamber 88 to the first mixing chamber 60. As shown in FIG. 3, the second mixing chamber 88 is provided with a plurality of injection nozzles 92 which project into openings 94 in the top of the fuel intake header 46 for injecting the gaseous mixture from the second mixing chamber 88 into the fuel intake header 46, which in turn distributes the gaseous mixture to each of the intake ports 44 extending through the peripheral wall 12 of the engine housing 10 and into the suction space 30 of the engine.

When the gaseous mixture enters the suction space 30 of the engine, the lubricating vapor contained therein condenses on the inner surface 14 of the peripheral wall 12 of the engine housing 10, and thereby effects lubrication on the surfaces of the sealing members 28 in contact with the engine housing as the rotary piston 20 rotates within the engine housing. With the rotation of the rotary piston 20 within the engine housing, the combustible hydrogen fuel gas mixture is successively compressed, ignited by means of the sparkplugs 38, expanded, and finally exhausted through the exhaust ports 48, the exhaust gas header 50 and the exhaust pipe 52.

The above-described fuel supply and injection system in accordance with the present invention is so designed that each succeeding orifice area is larger in cross-section than the preceding orifice area so as to inhibit the building up in the system of any back pressure. This, together with the one-way valve 90 disposed in the gaseous mixture outlet 84 of the first mixing chamber 60 and the anti-backfire orifices 72 and 74 in the hydrogen gas conduit 56 and the oxidizing conduit 68, respectively, ensure operation of the engine without any danger of backfire of the combustible fuel gas mixture reaching the fuel gas sources. Moreover, the two mixing chambers, the fuel intake header and the multiple port fuel inlet passage ensure a thorough and uniform mixing of the fuel gases and an even distribution of the fuel gas mixture along the width of the intake chamber of the engine so as to produce a smooth and even firing of the fuel gas mixture within the engine.

In the embodiment of the present invention in FIGS. 1–3 and described above, lubricant for effecting lubrication of the surfaces of the rotary piston apex sealing members 28 in contact with the engine housing, is supplied to the interior of the engine through the fuel inlet passage 40 in the form of a lubricating vapor in admixture with the fuel gas mixture. In an alternative embodiment of the present invention, illustrated in FIGS. 4 and 5, lubricant is supplied to the interior of the engine in the form of a lubricating oil through a separate lubricating oil inlet passage, in which case the lubricant supply tank 76 could be eliminated from the fuel supply system shown in FIG. 1 so that the oxidizing gas conduit 68 would lead directly from the oxidizing gas source to the first mixing chamber 60.

Figure 4:
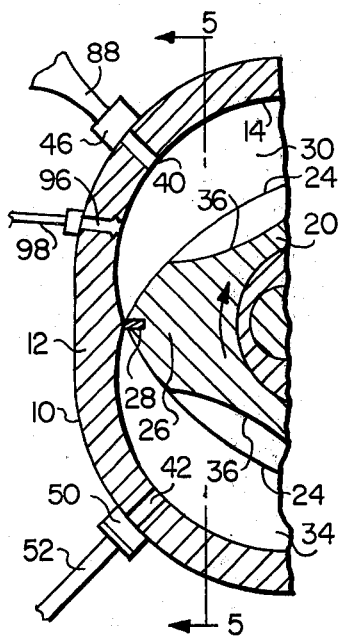
FIG. 4 is a partial elevational view, taken partly in vertical section, illustrating an alternative embodiment employing a separate lubricating oil inlet means.
Figure 5:
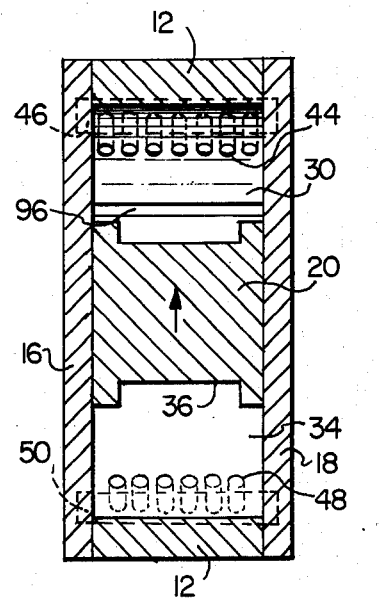
FIG. 5 is a sectional view taken substantially along the lines 5—5 of FIG. 4, looking in the direction of the arrows.

In the embodiment shown in FIGS. 4 and 5, the engine housing 10 is modified so as to include a lubricating oil inlet passage consisting of an inlaid strip 96 of hard porous material extending through the peripheral wall 12 thereof into the suction space 30 of the engine. As shown in FIG. 5, the inlaid strip 96 extends substantially across the width of the peripheral wall 12 of the engine housing transverse to the direction of rotation of the rotary piston 20. The inlaid strip 96 maybe made, for example, of sintered tungsten, tantalum, molybdenum, or any metal or ceramic material that exhibits the proper porosity so as to allow the passage of lubricating oil therethrough and the proper hardness so that its rate of wear is comparable to that of the surrounding housing wall to avoid premature failure of the piston apex sealing members 28 due to uneven surfaces between the inlaid strip and the surrounding housing wall. Lubricating oil from a lubricating oil supply tank, not shown, is supplied to the inlet passage through a lubricating oil conduit 98 and passes through the inlaid strip 96 either by cappillary flow or under pressure supplied by a suitable pump, not shown, included in the lubricating oil supply system.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A rotary piston internal-combustion engine adapted to operate on a combustible hydrogen fuel gas mixture, comprising: engine housing means; polygonal piston means within said housing means rotatable relative to said housing means and cooperating therewith to effectively define therebetween a plurality of working chambers that rotate about the axis of said housing means and cyclically vary in volume as said piston means rotates relative to said housing means so as to effectively provide in succession a suction space, a compression space and an expansion space; a plurality of apex seal means connected to and circumferentially spaced around the periphery of said piston means and in sliding engagement with said housing means; hydrogen fuel gas mixture inlet passage means extending through the wall of said housing means into said suction space and comprising a plurality of intake ports spaced along a line extending substantially across the width of said housing means transverse to the direction of rotation of said piston means; hydrogen fuel gas mixture supply means for supplying said combustible hydrogen fuel gas mixture from a hydrogen fuel gas mixture source to said hydrogen fuel gas mixture inlet passage means, said hydrogen fuel gas mixture supply means terminating in hydrogen fuel gas mixture intake header means on the outer surface of said housing means covering all of said intake ports for distributing said hydrogen fuel gas mixture to each of said intake ports; exhaust gas outlet passage means extending through the wall of said housing means from said expansion space comprising a plurality of exhaust ports spaced along a line extending substantially across the width of said housing means transverse to the direction of rotation of said piston means and the line of said exhaust ports being staggered in relationship to the line of said intake ports for maintaining even wear on said apex seal means; and means for delivering a lubricating fluid into said working chambers to lubricate said apex seals.

2. The rotary piston internal-combustion engine of claim 1 wherein said exhaust gas outlet passage means further includes exhaust gas header means on the outer surface of said housing means covering all of said exhaust ports and terminating in a single exhaust pipe.

3. The rotary piston internal-combustion engine of claim 2 wherein the line of said intake ports and the line of said exhaust ports are spaced from each other across the line separating said suction space from said expansion space by at least 90° with respect to the main axis of the engine and the number of said intake ports and the number of said exhaust ports differ by 1.

4. The rotary piston internal-combustion engine of claim 1, wherein said delivering means includes lubricating oil inlet means extending through the wall of said housing means, into said suction space and comprising an inlaid strip of hard porous material extending substantially across the width of said housing means transverse to the direction of rotation of said piston means, and lubricating oil supply means for supplying lubricating oil from a source thereof to said lubricating oil inlet means.

5. The rotary piston internal-combustion engine of claim 1, wherein said delivering means includes lubricating vapor supply means connected to said fuel supply means for effecting of lubricating vapor with said combustible fuel gas mixture for injection into the interior of said housing means through said hydrogen fuel gas mixture inlet passage means, said lubricating vapor supply means comprising a source of lubricating oil and vaporizer means for converting said lubricating oil to lubricating vapor.

6. The rotary piston internal-combustion engine of claim 1 wherein said hydrogen fuel gas mixture supply means includes a first mixing chamber means for effecting initial mixing of the gases composing said combustible hydrogen fuel gas mixture, said first mixing chamber means having a hydrogen gas inlet, an oxidizing gas inlet and a gaseous mixture outlet; hydrogen gas conduit means for supplying hydrogen gas from a source thereof to said hydrogen gas inlet of said first mixing chamber means; oxidizing gas conduit means for supplying an oxidizing gas from a source thereof to said oxidizing gas inlet of said first mixing chamber means; and a second mixing chamber means for effecting further mixing of said hydrogen fuel gas mixture, said second mixing chamber means having a gaseous mixture inlet in communication with said gaseous mixture outlet of said first mixing chamber means and a plurality of injection nozzle means for injecting said hydrogen fuel gas mixture from said second mixing chamber means into said hydrogen fuel gas mixture intake header means.

7. The rotary piston internal-combustion engine of claim 6, further including one-way valve means disposed in said gaseous mixture outlet of said first mixing chamber means for preventing backflow of said gaseous mixture from said second mixing chamber means to said first mixing chamber means.

8. The rotary piston internal-combustion engine of claim 6, further including anti-backfire orifice means both in said hydrogen gas conduit means and in said oxidizing gas conduit meand for preventing backfire of said combustible hydrogen fuel gas mixture from reaching said source of hydrogen fuel gases.

9. The rotary piston internal-combustion engine of claim 6, wherein said delivering means includes lubricating vapor supply means in communication with said oxidizing gas conduit means, whereby lubricating vapor is carried with said oxidizing gas to said first mixing chamber means and admixed with said combustible hydrogen fuel gas mixture for injection into the interior of said housing means through said hydrogen fuel inlet passage means, said lubricating vapor supply means comprising a source of lubricating oil and vaporizer means for converting said lubricating oil to lubricating vapor.

10. The rotary piston internal-combustion engine of claim 9, wherein said lubricating vapor supply means comprises a tank having a lower portion filled with lubricating oil and provided with heating means for vaporizing said lubricating oil, and an upper portion containing the vaporized lubricating oil, and said oxidizing gas conduit means passes through and opens into said upper portion of said tank so as to carry said lubricating vapor with said oxidizing gas.

* * * * *